US011091357B2

(12) United States Patent
Hatfield et al.

(10) Patent No.: US 11,091,357 B2
(45) Date of Patent: Aug. 17, 2021

(54) PULLEY FOR A WEARABLE ARTICLE

(71) Applicant: NIKE, Inc., Beaverton, OR (US)

(72) Inventors: Tinker L. Hatfield, Portland, OR (US); Austin Orand, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 27 days.

(21) Appl. No.: 16/678,529

(22) Filed: Nov. 8, 2019

(65) Prior Publication Data

US 2020/0207595 A1 Jul. 2, 2020

Related U.S. Application Data

(60) Provisional application No. 62/785,445, filed on Dec. 27, 2018.

(51) Int. Cl.

| | |
|---|---|
| ***B66D 3/04*** | (2006.01) |
| ***B60P 7/08*** | (2006.01) |
| ***A43C 11/16*** | (2006.01) |
| ***B66D 1/36*** | (2006.01) |

(52) U.S. Cl.

CPC .............. *B66D 3/04* (2013.01); *A43C 11/165* (2013.01); *B66D 1/36* (2013.01)

(58) Field of Classification Search

CPC .......... A43C 11/165; B66D 3/04; B66D 1/36; B60P 7/083; B60P 7/0853

See application file for complete search history.

(56) References Cited

U.S. PATENT DOCUMENTS

| | | | | |
|---|---|---|---|---|
| 786,406 A | | 4/1905 | Boynton | |
| 1,733,640 A | * | 10/1929 | Wright .................. | B66D 3/046 254/406 |
| 2,845,233 A | | 7/1958 | Pfankuch et al. | |
| 4,007,532 A | | 2/1977 | Einhorn et al. | |
| 4,173,332 A | * | 11/1979 | DuLondel ................ | A62B 1/08 182/241 |
| 4,350,313 A | | 9/1982 | Adomeit | |
| 4,619,418 A | | 10/1986 | Butenop | |
| 4,671,859 A | | 6/1987 | Pliefke | |
| 5,687,460 A | | 11/1997 | Foffano et al. | |
| 6,711,787 B2 | | 3/2004 | Jungkind et al. | |

(Continued)

FOREIGN PATENT DOCUMENTS

| | | |
|---|---|---|
| DE | 10239954 A1 | 3/2004 |
| DE | 202015101056 U1 | 6/2015 |

(Continued)

*Primary Examiner* — Michael E Gallion

(74) *Attorney, Agent, or Firm* — Quinn IP Law

(57) ABSTRACT

A pulley for a wearable article includes a frame defining an aperture and a slot spaced apart from the aperture. A pulley wheel is disposed exterior to the frame, and a hub extends from the pulley wheel through the aperture. The hub engages the frame in a locked position, and is disengaged from the frame in an unlocked position. The hub is further from the slot in the locked than in the unlocked position. The hub and the pulley wheel are rotatable relative to the frame in the locked position. In another pulley, a frame defines an internal void and a slot extending through the frame and spaced apart from the internal void. A pulley wheel disposed exterior to the frame is spaced apart from the slot. A plurality of legs extends from the pulley wheel and is locked to the frame. The frame may include an anchor bar.

20 Claims, 8 Drawing Sheets

(56) References Cited

U.S. PATENT DOCUMENTS

| | | | | |
|---|---|---|---|---|
| 9,629,417 | B2 | 4/2017 | Cavanagh et al. | |
| D815,562 | S | 4/2018 | Schommer et al. | |
| 10,624,423 | B2 * | 4/2020 | Orand | A43C 11/165 |
| 10,834,999 | B2 * | 11/2020 | Orand | A43B 13/22 |
| 2002/0178548 | A1 | 12/2002 | Freed | |
| 2003/0020288 | A1 | 1/2003 | Junking et al. | |
| 2006/0021204 | A1 | 2/2006 | Young | |
| 2011/0258876 | A1 | 10/2011 | Baker et al. | |
| 2011/0308892 | A1 * | 12/2011 | Saarelainen | B66B 15/02 187/266 |
| 2012/0246897 | A1 | 10/2012 | Lee | |
| 2014/0196313 | A1 | 7/2014 | Hatfield et al. | |
| 2017/0332734 | A1 * | 11/2017 | Orand | A43B 13/04 |
| 2018/0110295 | A1 | 4/2018 | Dyer et al. | |
| 2020/0077748 | A1 * | 3/2020 | Dyer | A43C 1/06 |
| 2020/0205524 | A1 | 7/2020 | Hatfield et al. | |

FOREIGN PATENT DOCUMENTS

| | | | |
|---|---|---|---|
| DE | 102018201019 | A1 | 8/2018 |
| KR | 20040049723 | A | 6/2004 |

* cited by examiner

PULLEY FOR A WEARABLE ARTICLE

CROSS-REFERENCE TO RELATED APPLICATION

This application claims the benefit of priority to U.S. Provisional Application No. 62/785,445, filed Dec. 27, 2018, which is hereby incorporated by reference in its entirety.

TECHNICAL FIELD

The present disclosure generally relates to a pulley, and to a wearable article including the pulley.

BACKGROUND

Pulleys are convenient devices used for changing the direction of a tensioning cable. Wearable articles such as footwear, garments, headwear, other apparel, and carry bags may include a closure system that adjusts the fit of the wearable article to the body. For example, a closure system for an article of footwear may include a lace that is tied once the foot is received within the article of footwear to tighten the article of footwear around the foot.

BRIEF DESCRIPTION OF THE DRAWINGS

The drawings described herein are for illustrative purposes only, are schematic in nature, and are intended to be exemplary rather than to limit the scope of the disclosure.

DESCRIPTION

Figure 1:
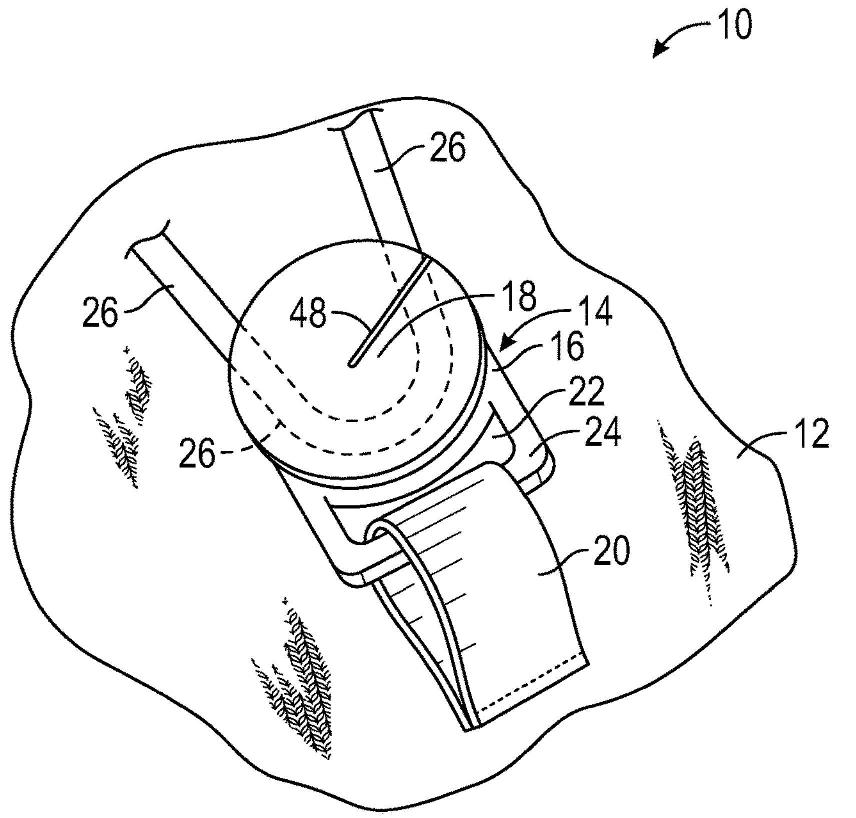
FIG. 1 is a fragmentary perspective view of a pulley secured to a wearable article with a tensioning cable extending through the pulley.

The present disclosure generally relates to pulley with a pulley wheel and a frame. In various aspects, the pulley may direct or anchor a tensioning cable, for example, when included in a wearable article. In an example, a pulley may comprise a frame defining an aperture and further defining a slot spaced apart from the aperture. The pulley may include a pulley wheel disposed exterior to the frame, and a hub extending from the pulley wheel through the aperture. The hub may engage the frame in a locked position, and may be disengaged from the frame in an unlocked position. The hub may be further from the slot in the locked position than in the unlocked position. The hub and the pulley wheel may be rotatable relative to the frame about a center axis of the hub when in the locked position. Thus, the pulley wheel is easily assembled with and locked to the frame in a locked position in which it is rotatable relative to the frame, such as by a tensioning cable.

In one or more implementations, the aperture may have a narrowed neck, and the hub may engage the frame at the narrowed neck when the hub is in the locked position. In one or more configurations, the aperture may have a relatively wide portion adjacent to the narrowed neck. The relatively wide portion may be wider than the narrowed neck, and may be between the slot and the narrowed neck.

In an aspect, the frame may further comprise an anchor bar, with the slot between the anchor bar and the aperture. In another aspect, the pulley wheel may extend further over the slot when the hub is in the locked position than when the hub is in the unlocked position. For example, when the hub is moved from the unlocked position to the locked position, it may move away from the anchor bar and the slot to engage the frame at the narrowed neck. This allows for a relatively compact pulley with an anchor bar that can be used to anchor the pulley to a base, such as to a fabric panel of a wearable article, by an anchoring strap extending through the slot.

In yet another aspect, the hub may have a textured exterior surface. For example, the textured exterior surface may include a plurality of grooves extending lengthwise parallel to the center axis of the hub. The textured exterior surface provides friction that helps to engage the hub with a tensioning cable disposed around the hub, so that the hub and pulley wheel rotate when the tensioning cable moves around the hub. For example, when used as part of a closure system of a wearable article, the wearer can visually gauge the tightness of the closure system by the position of the marker.

In one or more implementations, the pulley wheel may have an exterior surface with a marking on the exterior surface. The marking may be positioned and shaped as an indicator of a rotational position of the pulley wheel. Accordingly, in an example, when the pulley wheel is made to rotate by the engagement of the tensioning cable with the textured exterior surface of the hub, the marking moves with the rotating pulley wheel and visually indicates the change in rotational position of the pulley wheel, which may indicate, for example, a degree of tensioning of the tensioning cable.

In one or more configurations, the frame may include a first plate and a second plate spaced apart from the first plate. The first plate may be nearer to the pulley wheel than the second plate. The aperture may extend through the second plate. The hub may engage the frame at the second plate in the locked position. The first plate may have an additional aperture. The hub may also extend through the additional aperture.

In an aspect, the hub may include a radially-extending flange. The pulley wheel may be adjacent to an exterior surface of the first plate. The radially-extending flange may be adjacent to an exterior surface of the second plate when the hub is in the locked position.

In another aspect, the first plate and the second plate may be disc-shaped, each having a diameter not more than 10 percent less than and not more than 10 percent greater than a diameter of the pulley wheel. Accordingly, when the hub is in the locked position, the plates and the pulley wheel stack together in a relatively compact arrangement.

In a further aspect, the frame may have a side wall extending between and connecting the first plate and the second plate. The frame may define a continuous channel between the first plate and the second plate, inward of the side wall, and extending around the hub. The frame may define a side slot between the first plate and the second plate extending to the continuous channel. This configuration allows the tensioning cable to extend through the side slot and around the hub in the continuous channel.

In another example, a pulley may comprise a frame that defines an internal void and that further defines a slot extending through the frame and spaced apart from the internal void. The pulley may further comprise a pulley wheel disposed exterior to the frame and spaced apart from the slot, and a plurality of legs extending from the pulley wheel and locked to the frame so that the pulley wheel is non-rotatable relative to the frame. Moreover, the frame may comprise an anchor bar, with the slot between the anchor bar and the internal void. In this example, the pulley wheel need not be rotatable relative to the frame and the pulley may simply anchor an end of the tensioning cable which may be secured to the frame within the internal void, for example.

In one or more implementations, a center axis of the pulley wheel may be sufficiently spaced from the slot such that the pulley wheel does not block the slot.

In one or more configurations, the frame has a plate with spaced through holes extending to the internal void. The plurality of legs may extend into the spaced through holes and engage with the plate to lock the pulley wheel to the frame.

In an aspect, the frame has a side wall extending around the internal void, and the frame defines a side slot extending through the side wall. In a further aspect, the side slot may extend lengthwise in an arc about a center axis of the pulley wheel.

In another example, a wearable article may comprise a base and a pulley. The pulley may comprise a frame that defines an aperture and that further defines a slot spaced apart from the aperture. The pulley may also comprise a pulley wheel disposed exterior to the frame, and a hub extending from the pulley wheel through the aperture. The hub may engage the frame in a locked position, and may be disengaged from the frame in an unlocked position. The hub may be further from the slot in the locked position than in the unlocked position. The hub and the pulley wheel may be rotatable relative to the frame about a center axis of the hub when in the locked position. The wearable article may also comprise an anchoring strap and a tensioning cable. The anchoring strap may secure to the base and may extend through the slot to anchor the pulley to the base. The tensioning cable may extend around the hub and may engage the hub to rotate the pulley wheel when tensioned.

In one or more implementations of the wearable article, the frame may have a first plate, a second plate, and a side wall extending between and connecting the first plate and the second plate. The frame may define a continuous channel between the first plate and the second plate, inward of the side wall, and extending around the hub. The frame may define a side slot between the first plate and the second plate extending to the continuous channel. The tensioning cable may extend through the side slot and around the hub in the continuous channel.

In one or more configurations of the wearable article, the hub may have a textured surface. The tensioning cable may engage the textured surface to turn the hub when the tensioning cable is tensioned.

The above features and advantages and other features and advantages of the present teachings are readily apparent from the following detailed description of the modes for carrying out the present teachings when taken in connection with the accompanying drawings.

Referring to the drawings, wherein like reference numbers refer to like components, FIG. 1 shows a wearable article 10 that includes a base 12 and a pulley 14. The base 12 may be a fabric panel or other construction, and may be a variety of materials, such as leather, textiles, polymers, cotton, foam, composites, etc. For example, the base 12 may be a polymeric material capable of providing elasticity, and may be of a braided construction, a knitted (e.g., warp-knitted) construction, or a woven construction. The wearable cable 10 may be footwear, a garment, headwear, other apparel, a carry bag, etc. The base 12 may be an upper of an article of footwear, a portion of a garment, headwear, or other apparel, or a portion of a carry bag.

The pulley 14 includes a frame 16 and a pulley wheel 18 that it rotatable relative to the frame 16. The pulley 14 is secured to the base 12 by an anchoring strap 20 that is stitched or otherwise secured to the base 12. The anchoring strap 20 extends through a slot 22 defined by the frame 16 such that the strap 20 wraps around an anchor bar 24 of the frame 16 to anchor the pulley 14 to the base 12. As discussed herein, a tensioning cable 26 engages a hub that extends from the pulley wheel 18 to rotate the pulley wheel 18 when the tensioning cable 26 is tensioned, such as by pulling on one segment of the tensioning cable 26. The anchoring strap 20 secures the frame 16 such that it is not made to rotate by any frictional forces that may be exerted on it by the rotating pulley wheel 18.

Figure 2:
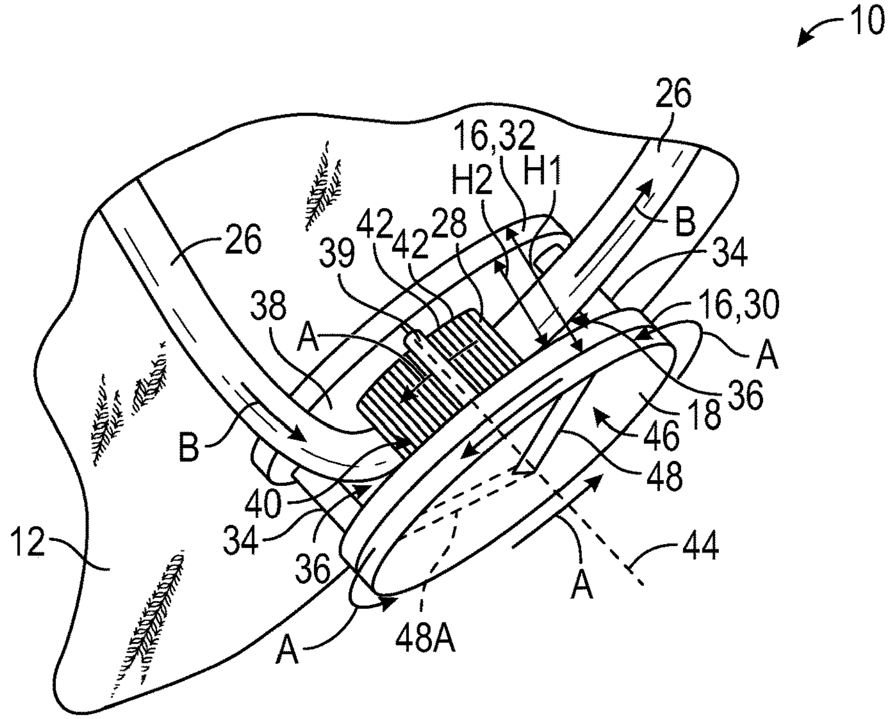
FIG. 2 is another fragmentary perspective view of the pulley and wearable article of FIG. 1.

FIG. 2 shows the pulley wheel 18 disposed exterior to the frame 16. A hub 28 extends from the pulley wheel 18 through apertures in the frame 16, as discussed with respect to FIG. 9. The frame 16 includes a first plate 30 and a second plate 32 spaced apart from one another with the first plate 30 nearer to the pulley wheel 18 than the second plate 32. A distance from the exterior surface of the first plate 30 to the exterior surface of the second plate 32 is the height H1 taken parallel with the axis 44. A distance H2 between the interior surfaces of the plates 30, 32 is the height H2 taken parallel with the axis 44. Although shown in contact with the first plate 30, there may be a slight axial spacing between the first plate 30 and the pulley wheel 18 to prevent friction between the first plate 30 and the rotating pulley wheel 18.

The frame 16 also includes a side wall 34 extending between and connecting the first plate 30 and the second plate 32. The frame 16 defines a continuous channel 36 between the first plate 30 and the second plate 32, inward of the side wall 34, and extending around the hub 28. The frame 16 defines a side slot 38 between the first plate 30 and the second plate 32 extending to the continuous channel 36. The frame 16 includes a support leg 39 extending between and connecting the first plate 30 and the second plate across the side slot 38. The support leg 39 is positioned radially-outward of the hub 28 and apart from the hub 28 so that it does not interfere with rotation of the hub 28. In the embodiment shown, the frame 16 is a single, unitary, one-piece component including the first plate 30, the second plate 32, the side wall 34, the support leg 39, and the anchor bar 24. For example, the frame 16 may be a one-piece, plastic component, such as an injection molded component, or may be multiple discrete components connected to one another.

The tensioning cable 26 extends through the side slot 38 and around the hub 28 in the continuous channel 36. The ends of the side wall 34 and the hub 28 confine the segment of the tensioning cable 26 within the frame 16 to the continuous channel 36. The structure of the frame 16 and the hub 28 extending therethrough thus directs the cable 26 in the continuous channel 36.

The hub 28 has a textured surface 40. In the example shown, the textured surface 40 is a plurality of axial grooves 42 extending parallel with a center axis 44 of the hub 28. The textured surface 40 causes the tensioning cable 26 to engage the hub 28 to turn the hub 28 and rotate the pulley wheel 18 about a center axis 44 of the hub 28, as indicated by arrows A, when tensioning of the tensioning cable 26 causes the tensioning cable 26 to move through the continuous channel 36 as indicated by arrows B. Other configurations of textured surfaces may be used instead of axial grooves. For example, any geometries with a sufficient surface roughness to engage the cable 26 may be used.

The pulley wheel 18 has an exterior surface 46 with a marking 48 on the exterior surface. The marking 48 may be positioned and shaped as an indicator of a rotational position of the pulley wheel 18. For example, the marking 48 is a radially-extending line. The angular position of the marking 48 changes as the pulley wheel 18 rotates with tensioning of the cable 26, and may be a visual indicator of the tightness of the tensioning cable 26. When the pulley wheel 18 and hub 28 are made to rotate by the engagement of the tensioning cable 26 with the textured surface 40 of the hub 28, the marking 48 moves with the rotating pulley wheel 18 and visually indicates the change in rotational position of the pulley wheel 18, which may indicate, for example, a degree of tensioning of the tensioning cable 26. For example, due to rotation of the pulley wheel 18, the marking 48 is shown moved to a new position 48A, that, with repeated use, a wearer of the wearable article 10 may learn to associate with a specific degree of tightness of the article, or degree of closure of an opening in the article, etc. The marking 48 may be other shapes or positions that are configured so that the marking 48 appears differently oriented depending on the rotational position of the pulley wheel 18.

Figure 3:
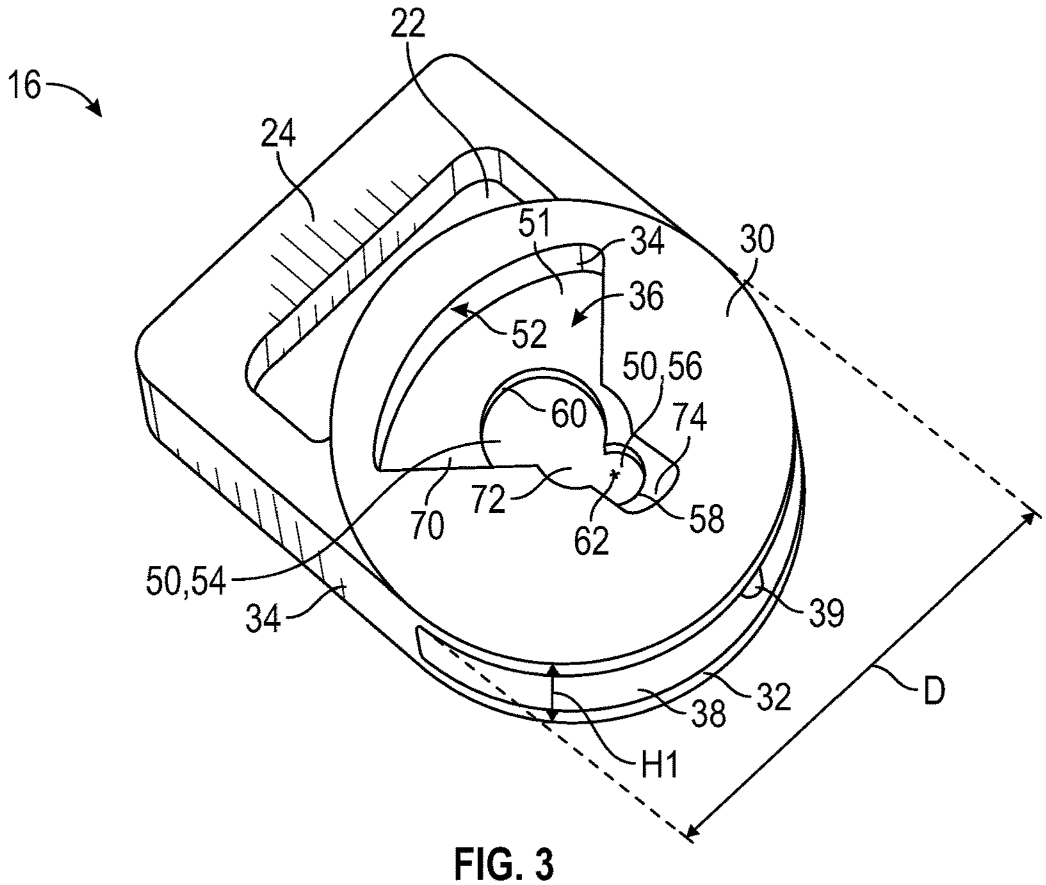
FIG. 3 is a top perspective view of a frame included in the pulley of FIG. 1.

FIG. 3 shows the frame 16 without the pulley wheel 18 and hub 28. With the pulley wheel 18, the hub 28 and the tensioning cable 26 removed, an aperture 50 defined by the second plate 32 and an additional aperture 51 defined by the first plate 30 are exposed. The aperture 50 extends through the second plate 32, and the aperture 51 extends through the first plate 30. State differently, the apertures 50 and 51 are through holes. The slot 22 is spaced apart from the apertures 50 and 51, such as by the side wall 34 which wraps around the frame 16 except for at the side slot 38. The slot 22 is between the anchor bar 24 and the apertures 50 and 51. The side wall 34 separates the slot 22 and the aperture 51, and the aperture 50 does not extend as far toward the slot 22 as the aperture 51, so that a portion of the second plate 32 also separates the slot 22 from the aperture 50. An interior surface 52 of the side wall 34 is shown in FIG. 2, and the continuous channel 36 is inward of the side wall 34, below the first plate 30 and above the second plate 32. The apertures 50, 51 are at least partially aligned with one another so that a passage entirely through the frame 16 is defined by the apertures 50, 51.

The aperture 50 in the second plate 32 has a relatively wide portion 54, and a relatively narrow portion extending from the relatively wide portion. The relatively narrow portion may be referred to as a narrowed neck 56. The relatively wide portion 54 is wider than the narrowed neck 56. The aperture 50 is disposed so that the relatively wide portion 54 is closer to the slot 22 than the narrowed neck 56. In other words, the relatively wide portion 54 is between the slot 22 and the narrowed neck 56. The edge 58 of the second plate 32 at the narrowed neck 56 is a segment of a circle that opens to the relatively wide portion 54. An edge 60 of the second plate 32 at the relatively wide portion 54 is a segment of a larger circle than that which edge 58 partially defines. Together, the relatively wide portion 54 and the narrowed neck 56 define a keyhole shape. An axis 62 through a center of the circular shape partially defined by the narrowed neck 56 is coincident with the center axis 44 of the hub 28 when the pulley 14 is assembled with the hub 28 in the locked position, as discussed herein.

The aperture 51 in the first plate 30 is larger than the aperture 50 and is aligned with the aperture 50 in that it extends over the aperture 50 in a direction along the axis 62 (e.g., perpendicular to the plates 30, 32). The aperture 51 includes a flared portion 70, a middle portion 72, and an end portion 74. The flared portion 70 tapers to the middle portion 72, which tapers further to the end portion 74. The flared portion 70 is aligned with the relatively wide portion 54, and the middle portion 72 is aligned with the narrowed neck 56. The flared portion 70 flares radially outward from the middle portion 72 to the side wall 34 in a pie shape, and is wider and longer than the relatively wide portion 54 above which it extends. Likewise, the middle portion 72 is wider and longer than the narrowed neck 56 of the aperture 50 above which it extends. The end portion 74 extends further away from the slot 22 than the narrowed neck 56 and is also wider than the narrowed neck 56. With this configuration, the aperture 51 does not inhibit the hub 28 in either the unlocked position or the locked position of the hub 28, nor does the aperture 51 inhibit the hub 28 moving from the unlocked position to the unlocked position, as discussed herein.

Figure 4:
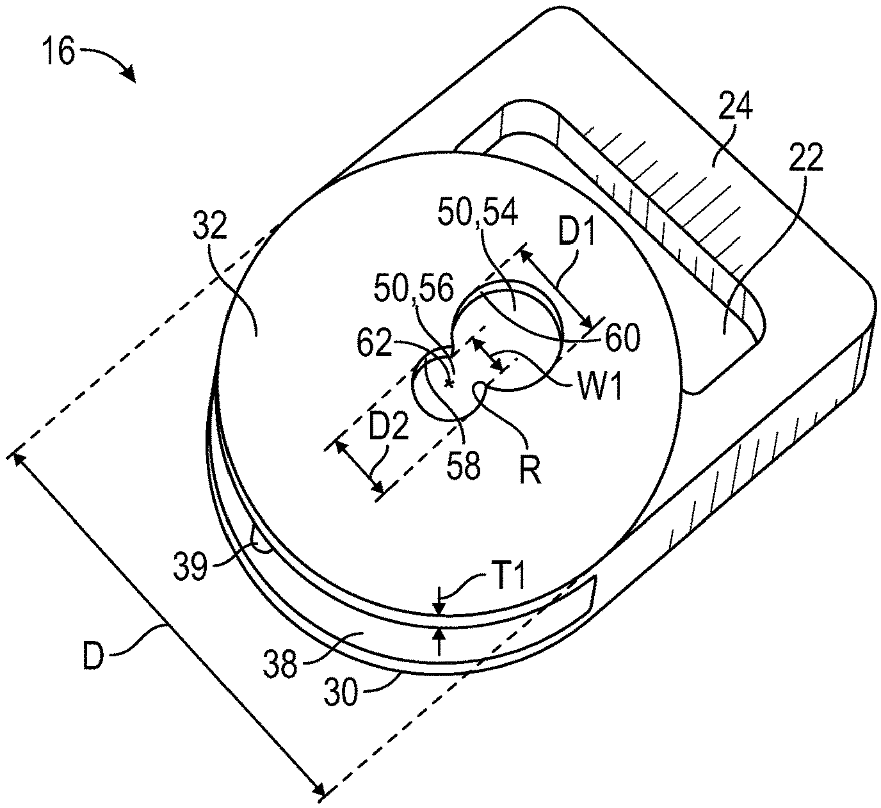
FIG. 4 is a bottom perspective view of the frame of FIG. 3.

FIG. 4 shows the frame 16 turned over relative to its position in FIG. 3 to show the second plate 32 above the first plate 30. The restriction R is the narrowest portion of the aperture 50 between the relatively wide portion 54 and the narrowed neck 56. The restriction R has a width W1 sufficiently wide to allow the hub 28 to pass from the relatively wide portion 54 to the narrowed neck 56 during assembly of the pulley 14 as described herein. The relatively wide portion 54 has a diameter D1 and the narrowed neck 56 has a diameter D2 that is less than diameter D1 and greater than width W1. The first plate 30 and the second plate 32 are both disc-shaped (e.g., flat, circular shapes that are wider than they are thick) each having an equal diameter D.

Figure 5:
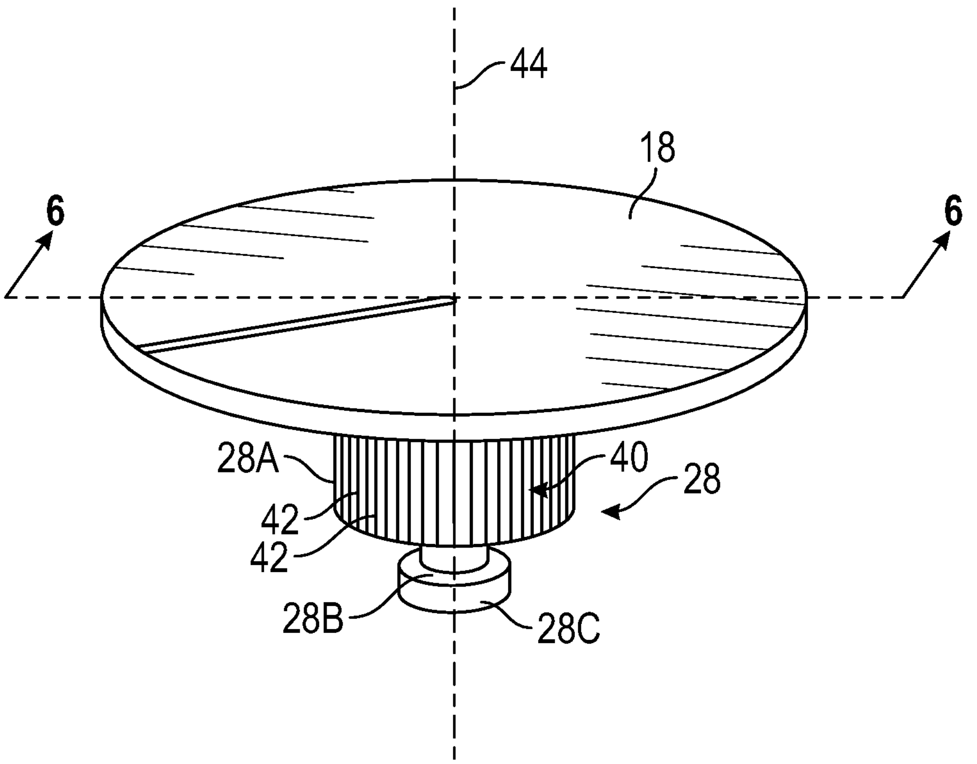
FIG. 5 is a perspective view of a unitary pulley wheel and hub of the pulley of FIG. 1.
Figure 6:
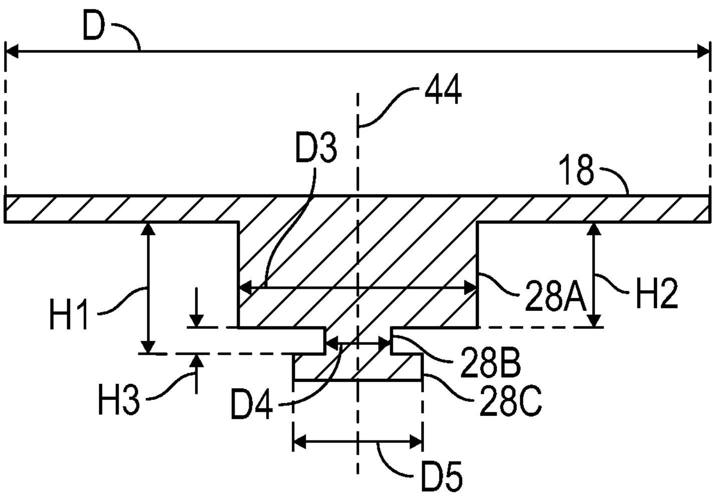
FIG. 6 is a cross-sectional view of the pulley wheel and hub of FIG. 5 taken at lines 6-6 in FIG. 5.

Referring to FIG. 5, the pulley wheel 18 is shown with the hub 28 extending therefrom along the axis 44. The hub 28 has portions of various different diameters, including a cable-engaging portion 28A that includes the textured surface 40, a shaft portion 28B, and a radially-extending flange 28C. As shown in FIG. 6, the pulley wheel 18 and the hub 28 are a one-piece, unitary component. The pulley wheel 18 and hub 28 may be a variety of materials, including, plastic or metal. Depending on the material used, the pulley wheel 18 with the hub 28 extending therefore may be cast or injection molded, for example.

As shown in FIG. 6, the pulley wheel 18 has a diameter D equal to that of the first plate 30 and the second plate 32. In some embodiments, the diameter of the pulley wheel 18 and the plates 30, 32 need not be equal, but the diameter of each of the plates 30, 32 is not more than 10 percent less than and not more than 10 percent greater than a diameter of the pulley wheel 18 to provide clearance at the slot 22 for the strap 20 when the hub 28 is in the locked position, and/or for aesthetic reasons. The cable-engaging portion 28A has a diameter D3 at its narrowest, which is at the bottom of the grooves 42. The shaft portion 28B has a diameter D4 less than the diameter D3 of the cable-engaging portion 28A. The radially-extending flange 28C has a diameter D5 that is larger than the diameter D4 of the shaft portion 28B and less than the diameter D3 of the cable-engaging portion 28A. Relative to the apertures 50 and 51, the diameter D3 of the cable-engaging portion 28A is less than the width of the middle portion 72 and greater than the width of the end portion 74. The diameter D4 of the shaft portion 28B is equal to or slightly greater than the width W1 of the aperture 50 at a restriction R where it narrows between the relatively wide portion 54 and the narrowed neck 56. The diameter D3 of the cable-engaging portion 28A and the diameter D5 of the radially-extending flange 28C are both greater than the width W1 of the aperture 50 at a restriction R. The diameter D5 of the radially-extending flange 28C is less than the diameter D1 of the relatively wide portion 54, and the diameter D3 of the cable-engaging portion 28A is greater than the diameter D1 of the relatively wide portion 54. This allows the hub 28 to extend through the aperture 51 and be positioned at the relatively wide portion 54, with the cable-engaging portion 28A between the first plate 30 and the second plate 32, with the pulley wheel 18 exterior to the first plate 30 (e.g., above the first plate 30 in FIG. 3), and with the radially-extending flange 28C exterior to the second plate 32 (e.g., below the second plate 32 in FIG. 3).

Figure 9:
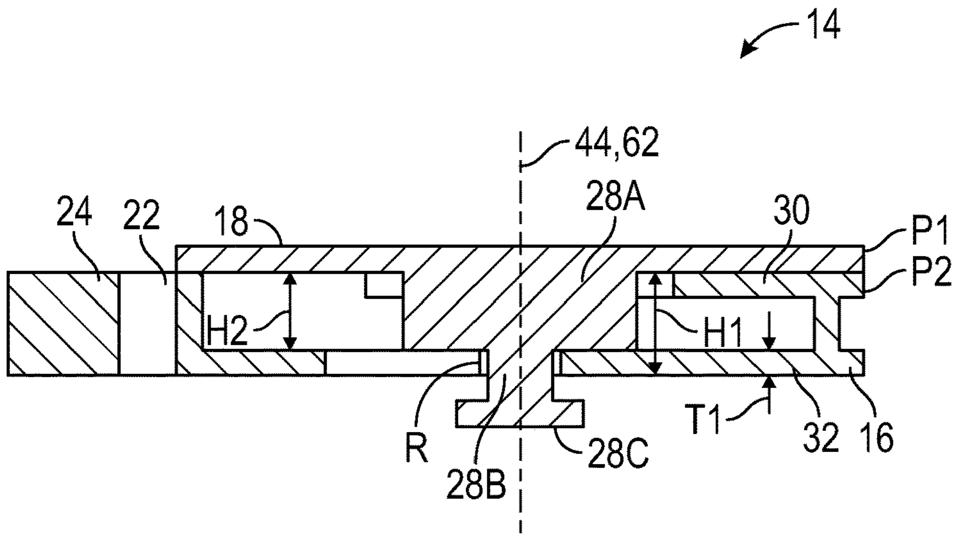
FIG. 9 is a cross-sectional view of the pulley of FIG. 8 taken at lines 9-9 in FIG. 8.

The distance from the underside of the pulley wheel 18 to the top of the radially-extending flange 28C taken parallel with the axis 44 is the height H1, the same as the spacing between the exterior surfaces of the plates 30, 32 shown in FIG. 2, or may be slightly greater than the height H2 to allow some clearance between the exterior surface of the plate 30 and the underside of the pulley wheel 18, and between the exterior surface of the plate 32 and the radially-extending flange 28C. The distance from the underside of the pulley wheel 18 to the bottom of the cable-engaging portion 28A is the height H2, the same as the distance between the interior surfaces of the plates 30, 32, or may be slightly less than the height H2 to allow some clearance between the bottom of the cable-engaging portion 28A and the second plate 32, and between the underside of the pulley wheel 18 and the first plate 30. The height H3 of the shaft portion 28B is the difference between the height H1 and the height H2, and is equal to or slightly greater than the thickness T1 of the second plate 32, which is indicated in FIGS. 4 and 9. With these configurations, the pulley wheel 18 is exterior to the exterior surface of the first plate 30 and the radially-extending flange 28C is adjacent to an exterior surface of the second plate 32 when the pulley 14 is assembled.

To assemble the pulley 14, the hub is inserted through the aperture 51 at the flared portion 70 and then down through the aperture 50 at the relatively wide portion 54 until the radially-extending flange 28C extends below the exterior surface of the second plate 32. For example, when the underside of the pulley wheel 18 contacts the exterior of the first plate 30, the radially-extending flange 28C will have extended far enough to be below the exterior surface of the second plate 32.

Figure 7:
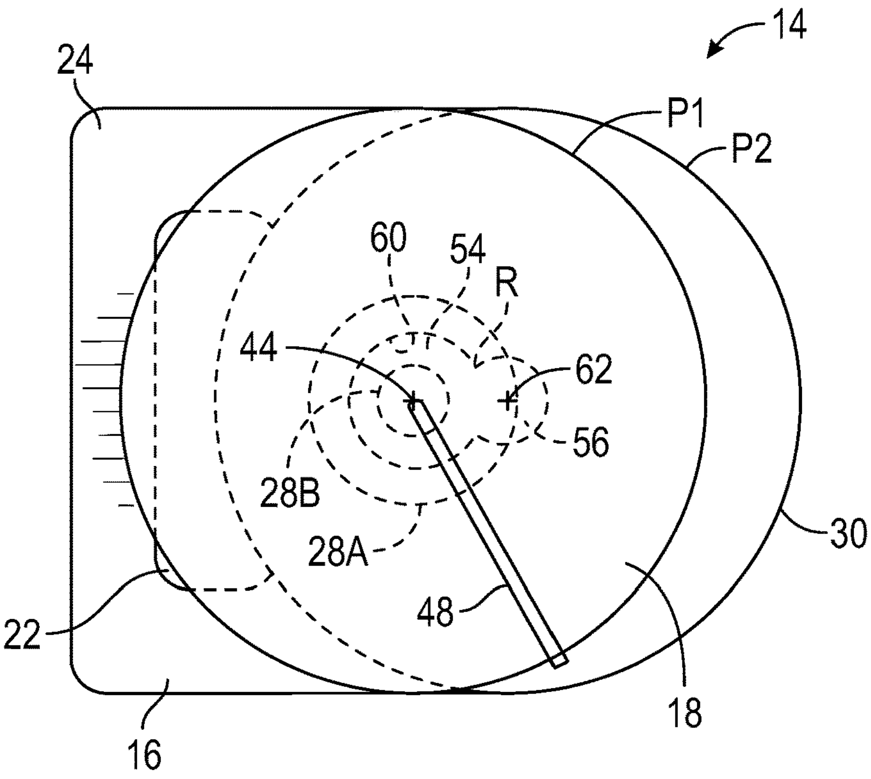
FIG. 7 is a top view of the pulley of FIG. 1 with the hub in an unlocked position.

As shown in FIG. 7, when the shaft portion 28B of the hub 28 extends through the relatively wide portion 54, the periphery P1 of the pulley wheel 18 is not aligned with the periphery P2 of the first plate 30, and the pulley wheel 18 extends at least partially over the slot 22, at least partially blocking the slot 22 on the side of the frame 16 with the first plate 30. The position of the hub 28 as represented by the cable-engaging portion 28A and the radially-extending flange 28C in FIG. 7 is referred to as the unlocked position, because the hub 28 is easily moved laterally in multiple directions until the shaft portion 28B touches the edge 60 of the second plate 32 at the relatively wide portion 54.

If the pulley wheel 18 and hub 28 are moved laterally from the unlocked position of FIG. 7 through the narrowest portion of the aperture 50 into the narrowed neck 56, if the shaft portion 28B is slightly wider than the width W1 at the restriction R, with some force it can be pushed past the restriction at the width W1 into the narrowed neck 56. The shaft portion 28B will snap past the narrowest portion at the restriction R into the narrowed neck 56, and will effectively be locked to the frame 16 in the locked position of FIG. 8, with the axis 44 coaxial with the axis 62. The shaft portion 28B is this snap-fit to the locked position. The hub 28 is said to be engaged with the frame 16 in the locked position because the plate 32 is held at the shaft portion 28B between the cable-engaging portion 28A and the radially-extending flange 28C, and the shaft portion 28B is retained within the narrowed neck 56 unless a force is applied to disassemble the pulley 14 by pushing the hub 28 past the narrowing restriction R at the width W1 into the relatively wide portion 54. Because the diameter D4 of the shaft portion 28B is equal to or slightly greater than the width W1 of the aperture 50 where it narrows between the relatively wide portion 54 and the narrowed neck 56, without a pushing force, the hub 28 will stay in the locked position of FIG. 8. Moreover, because the tensioning cable 26 wraps around and engages the cable-engaging portion 28A between the cable-engaging portion 28A and the slot 22, forces of the cable 26 on the cable-engaging portion 28A pull the hub 28 toward the locked position rather than the unlocked position. The tensioning cable 26 may be threaded through the continuous channel 36 after the hub 28 is locked to the frame 16, or may be disposed in the continuous channel 36 before the hub 28 is inserted through the apertures 50, 51 and locked to the frame 16.

Figure 8:
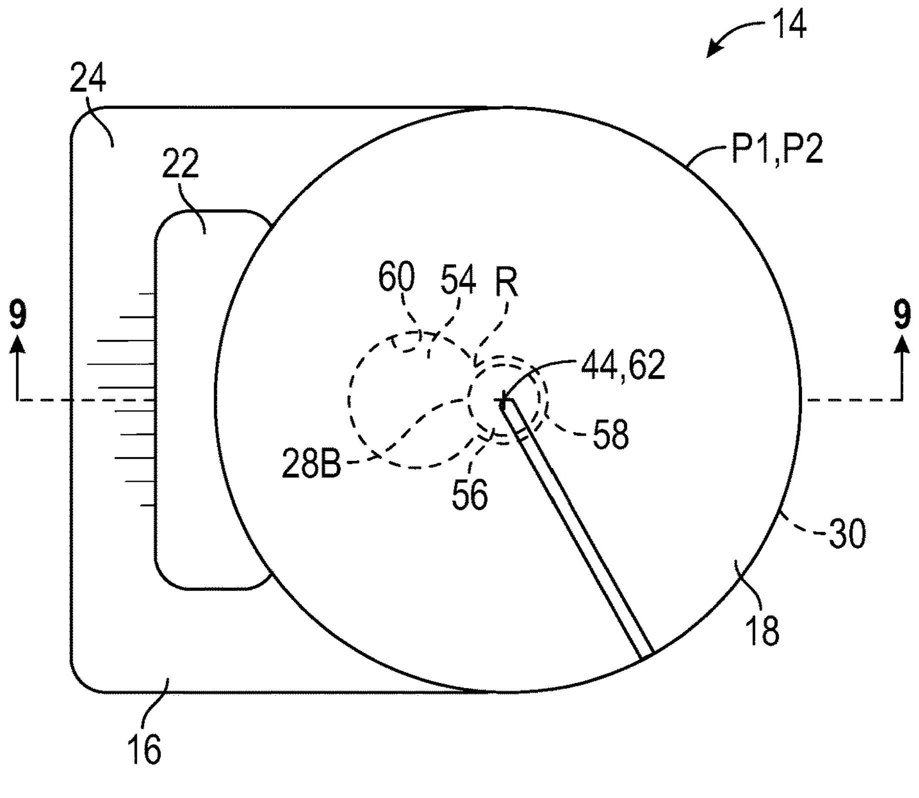
FIG. 8 is a top view of the pulley of FIG. 1 with the hub in a locked position.

As is apparent in FIGS. 8 and 9, when the hub 28 is in the locked position, the periphery P1 of the pulley wheel 18 is aligned with the periphery P2 of the first plate 30, and the pulley wheel 18 does not block the slot 22, or at least uncovers more of the slot 22 than when in the unlocked position. The hub 28 is further from the slot 22 in the locked position of FIG. 8 than in the unlocked position of FIG. 7. The hub 28 and the pulley wheel 18 are rotatable relative to the frame 16 about the center axis 44 of the hub 28 when in the locked position. As shown in FIG. 9, the hub 28 is engaged with the frame 16 in the locked position, with the plate 30 sandwiched between the cable-engaging portion 28A and the radially-extending flange 28C. The pulley wheel 18 is exterior to the exterior surface of the first plate 30 and the radially-extending flange 28C is adjacent to an exterior surface of the second plate 32 when the pulley 14 is assembled.

Figure 10:
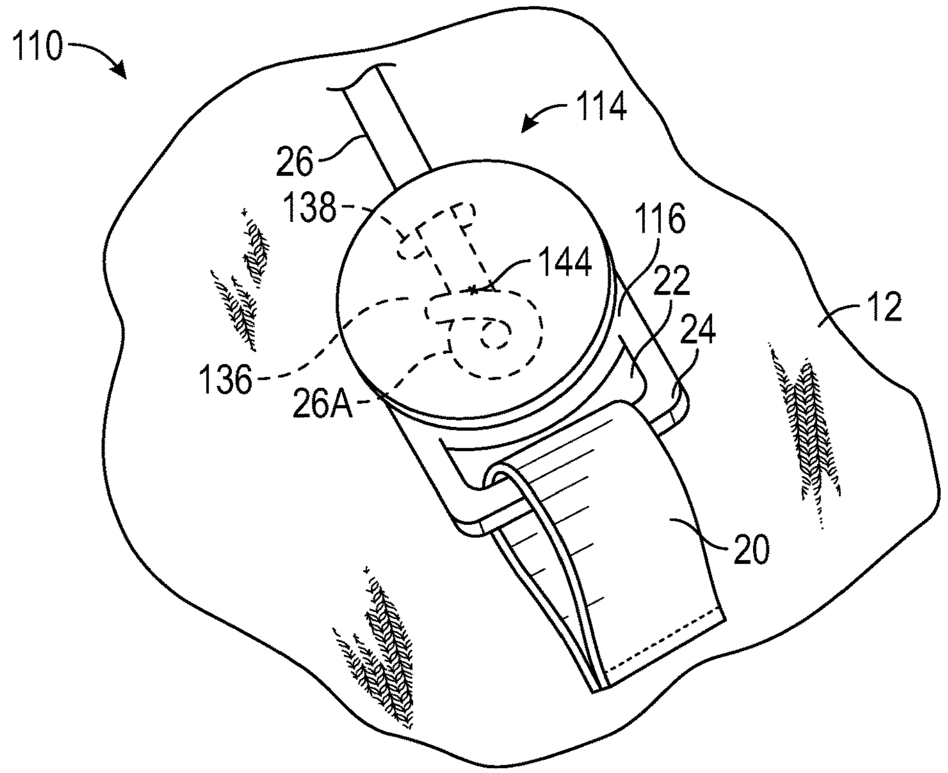
FIG. 10 is a fragmentary perspective view of a pulley secured to a wearable article with a tensioning cable secured to the pulley in another aspect of the disclosure.

FIG. 10 shows another wearable article 110 with a pulley 114 secured to a base 12. Although shown a different wearable cable 110, the pulley 114 could be secured to the same base 12 of the wearable article 10 and could secure an end of the tensioning cable 26 that extends through the pulley 14. Like pulley 14, the pulley 114 has a frame 116 with an anchor bar 24 and defines a slot 22. The frame 116 is anchored to the base 12 by an anchoring strap 20 that extends through the slot 22. The pulley 114 has a pulley wheel 118 engaged with the frame 116. The pulley wheel 118 is disc-shaped, with a center axis 144. However, unlike pulley wheel 18 and frame 16 of pulley 14, the pulley wheel 118 is not rotatable relative to the frame 116. A tensioning cable 26 extends out of a side slot 138 of the frame 116, as further discussed herein. The tensioning cable 26 has an end 26A that may be a knotted end, as indicated with hidden lines in FIG. 10, and is secured to the pulley 114 rather than able to move through the pulley as tensioning cable 26 moves through pulley 14. The knotted end 26A may be adhered to the pulley 114 in an internal void 136 or may simply be too large to fit through the side slot 138.

Figure 11:
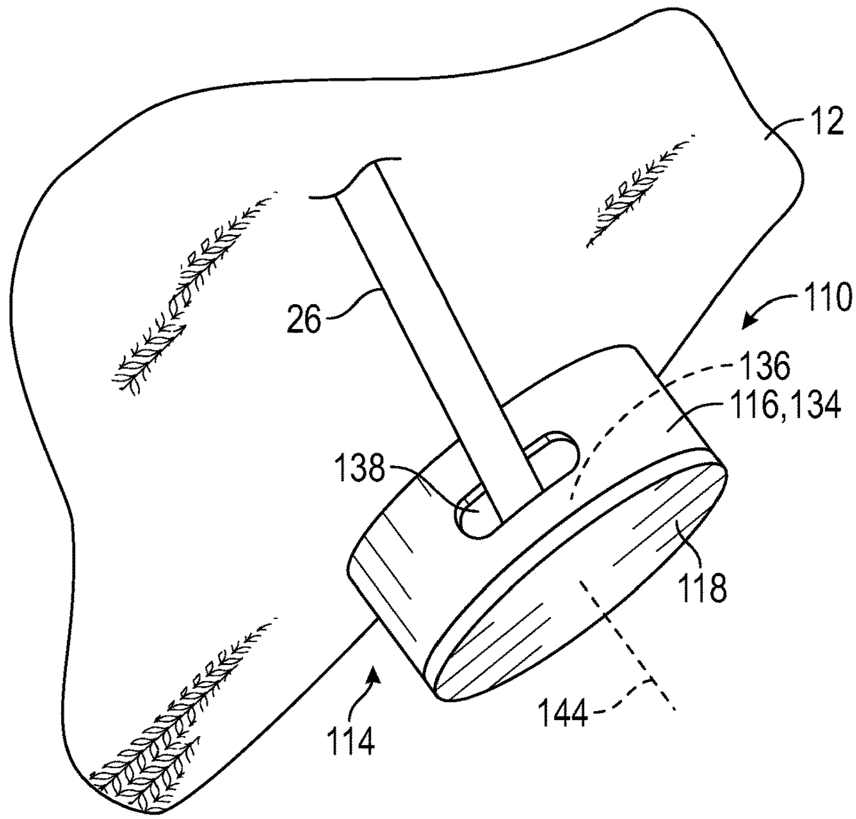
FIG. 11 is another fragmentary perspective view of the pulley and wearable article of FIG. 10.

Referring to FIG. 11, the frame 116 includes a cylindrical side wall 134. The side wall 134 defines the side slot 138, which extends through the side wall. The side slot 138 extends lengthwise partway around the cylindrical side wall 134, such that the side slot 138 extends in an arc about the center axis 144 of the pulley wheel 118. The arced shape of the side slot 138 is best shown in FIG. 12.

Figure 12:
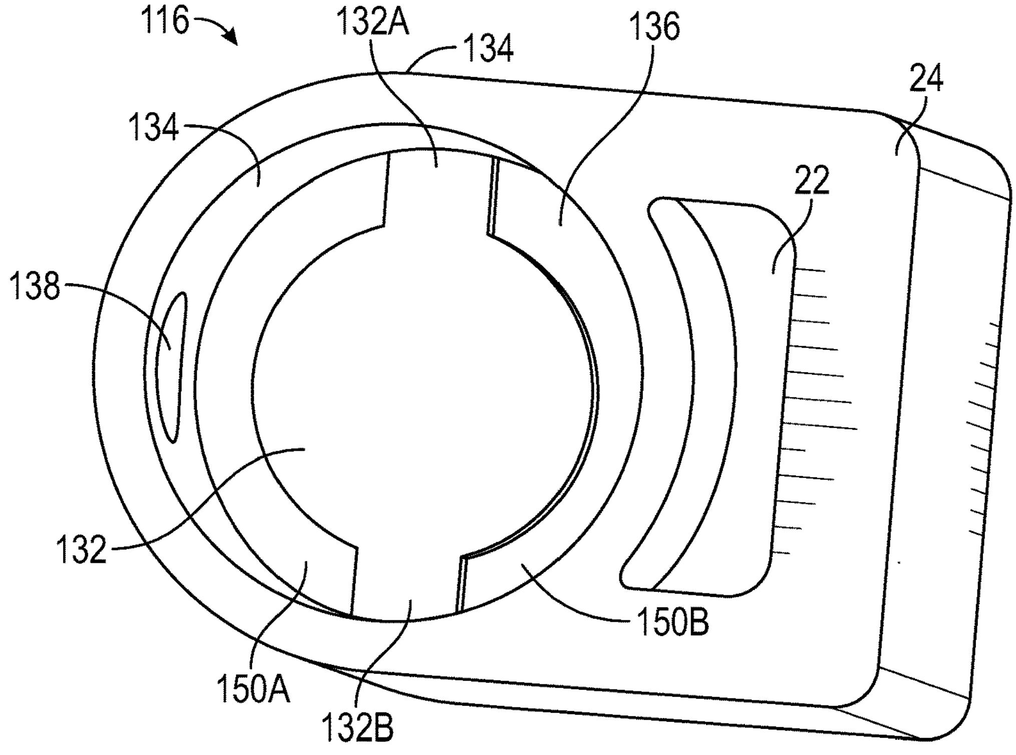
FIG. 12 is a top perspective view of a frame included in the pulley of FIG. 10.
Figure 13:
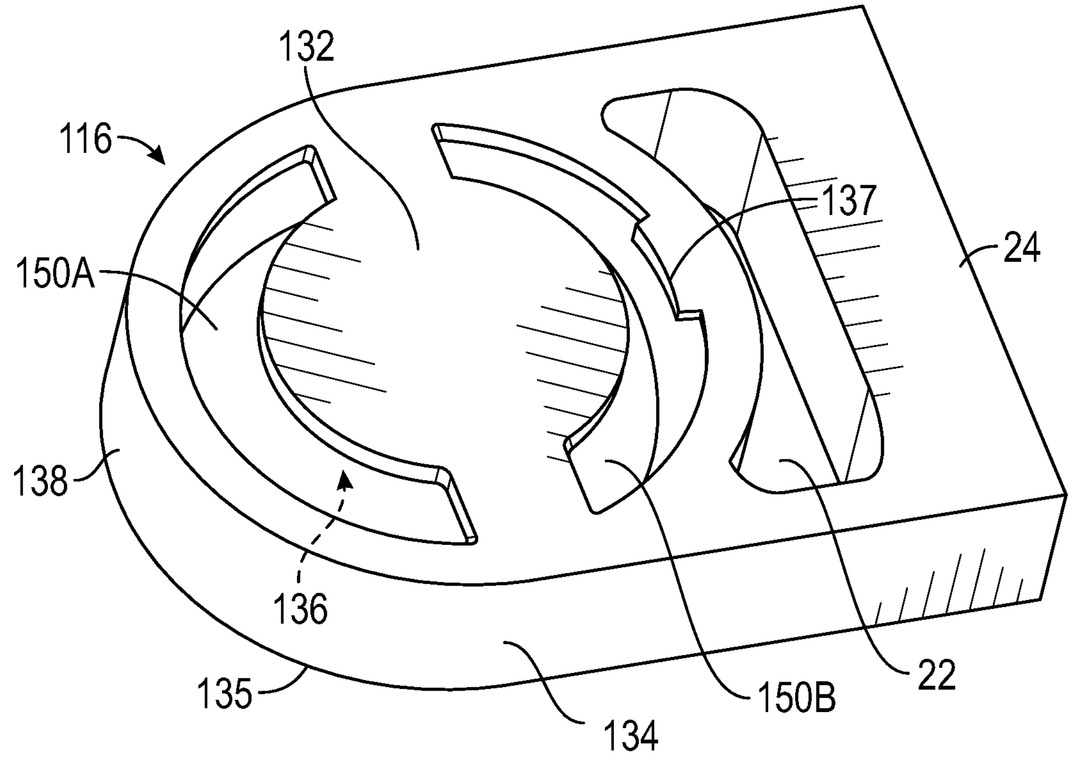
FIG. 13 is a bottom perspective view of the frame of FIG. 12.

FIG. 12 shows that the frame 116 defines the internal void 136 surrounded laterally by the side wall 134. The slot 22 is spaced apart from and separated from the internal void 136 by the side wall 134. The frame 116 includes a plate 132 bounding the bottom of the internal void 136. The internal void 136 opens at the top 135 of the side wall 134. Stated differently, the internal void 136 is a recess that extends downward from the top of the side wall 134 to the plate 132. The plate 132 has arc-shaped, spaced through holes 150A, 150B that extend through the plate 132 to the internal void 136. FIG. 13 shows the frame 116 turned over relative to FIG. 12, with a bottom side of the plate 132 shown above the side wall 134, and the top 135 of the side wall 134 extending downward. A tab 137 extends inward from the side wall 134 partway across the through hole 150B.

Figure 14:
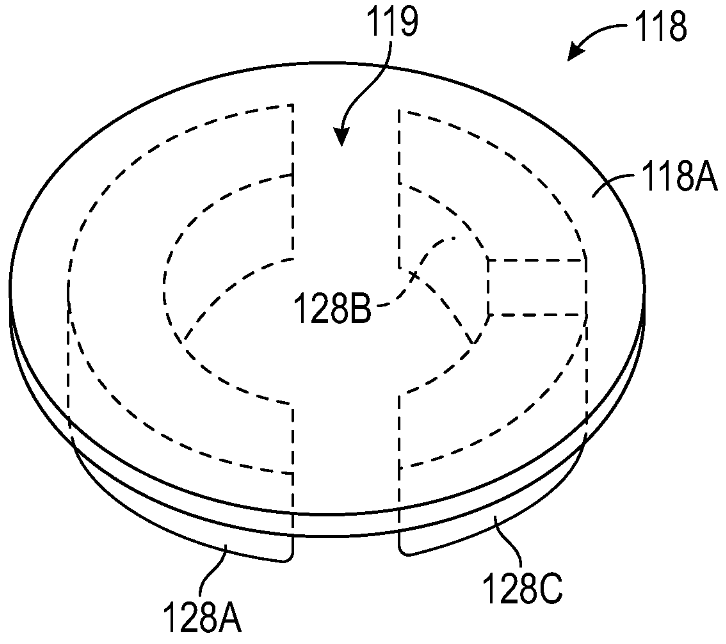
FIG. 14 is a top perspective view of a pulley wheel with a plurality of legs extending from the pulley wheel.
Figure 15:
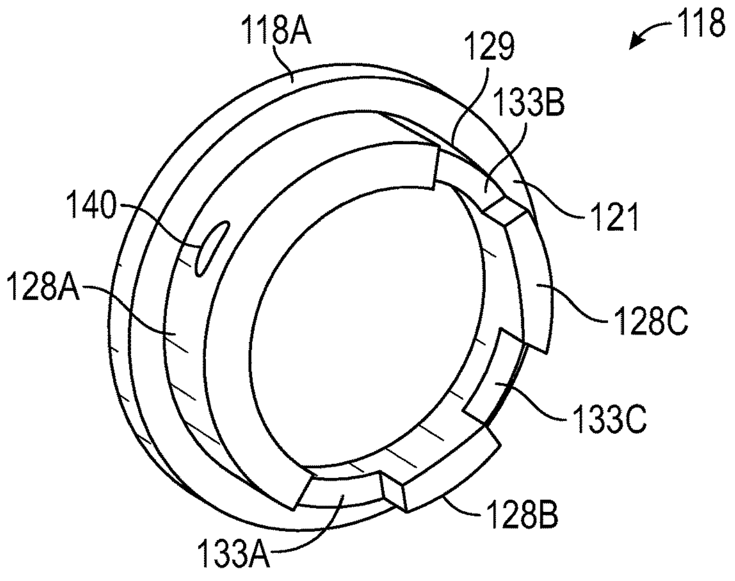
FIG. 15 is a bottom perspective view of the pulley wheel and the plurality of legs of FIG. 14.

FIG. 14 shows the pulley wheel 118 with a disc portion 118A, and a plurality of legs 128A, 128B, 128C extending downward from an underside of the disc portion 118A. The exterior surface 119 of the disc portion 118A is a flat circle. FIG. 15 shows the underside 121 of the disc portion 118A, and the legs 128A, 128B, 128C that extend from the underside 121. A slot 140 extends through the leg 128A. The legs 128A, 128B, 128C are spaced apart from one another and are each generally arc shaped. A first notch 133A separates the leg 128A and the leg 128B. A second notch 133B separates the leg 128A and the leg 128C. A third notch 133C separates the legs 128B and 128C. The notches 133A, 133B, 133C do not extend all the way to the bottom side of the pulley wheel 118. Instead, a short wall 129 extends downward from the pulley wheel 118 above the notches 133A, 133B and 133C.

The width of the first notch 133A between the legs 128A and 128B is equal to the width of a portion 132A of the plate 132 between ends of the through holes 150A, 150B shown in FIG. 12. The width of the second notch 133B between the legs 128A and 128C is equal to the width of a portion 132B of the plate 132 between opposite ends of the through holes 150A, 150B than the ends at the portion 132A, shown in FIG. 12. The width of the third notch 133C between the legs 128B and 128C is equal to the width of the tab 137 of the plate 132 shown in FIG. 13. Accordingly, the frame 116 is configured to interfit with and lock to the pulley wheel 118 by aligning the pulley wheel 118 over the frame 116 so that the legs 128A, 128B, 128C are inward of the side wall 134, and then moving the pulley wheel 118 toward the frame 116, inserting the legs 128A, 128B, 128C into the internal void 136 and toward the plate 132 until the portion 132A of the plate 132 enters the first notch 133A and the legs 128A, 128B press-fit around the portion 132A, extending through the through holes 150A, 150B, respectively. The second portion 132B of the plate 132 enters the second notch 133B and the legs 128A, 128C press-fit around the second portion 132B, extending through the through holes 150A, 150B, respectively. The tab 137 is disposed in the third notch 133C and press-fits between the legs 128B and 128C when the legs 128A, 128B and 128C extend through the through holes 150A, 150B. The slot 140 in the leg 128A is aligned with the side slot 138 when the pulley wheel 118 is assembled to the frame 116 in this manner. The tensioning cable 26 can extend out of the internal void 136 through the aligned slots 138, 140. The knotted end of the tensioning cable 26 may be larger than the slots 138, 140, so that it will be retained in the internal void 136.

Figure 16:
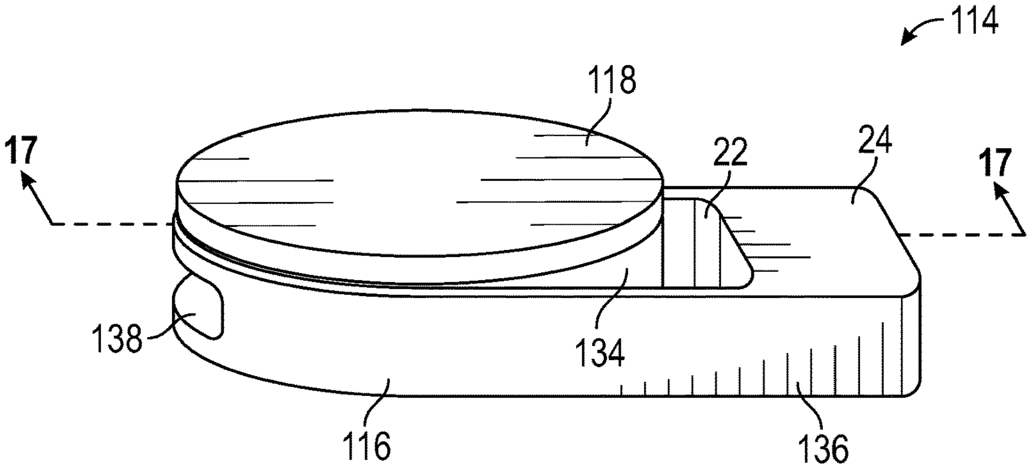
FIG. 16 is a perspective side view of the pulley of FIG. 10.
Figure 17:
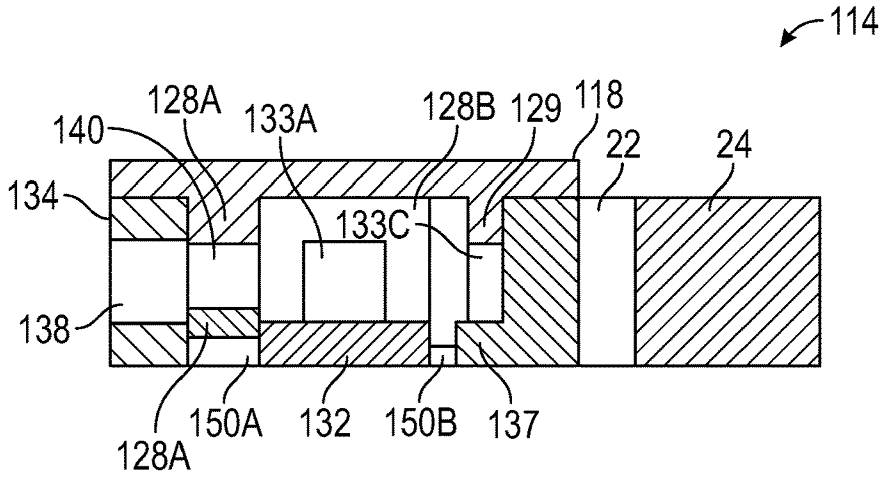
FIG. 17 is a cross-sectional view of the pulley of FIG. 16 taken at lines 17-17 in FIG. 16.

FIG. 16 shows the pulley 114 assembled to the frame 116, with the pulley wheel 118 exterior to the frame 116. The pulley wheel 118 does not block the slot 22. FIG. 17 is taken at lines 17-17 in FIG. 16, and shows the legs 128A, 128B inward of the side wall 134. The slot 140 is aligned with the side slot 138. The tab 137 is engaged with the frame 116 at the notch 133C.

Accordingly, the pulleys 14, 114 may be used to direct or anchor a tensioning cable 26, and the pulley wheels 18 and 118 are easily assembled with the respective frames 16 and 116. The pulleys 14, 114 may be included in the same wearable article 10, or in different wearable articles 10, 110 to provide closure or tightening of a base 12 via the tensioning cable 26.

The following Clauses provide example configurations of an article of footwear disclosed herein.

Clause 1: A pulley comprising: a frame defining an aperture and further defining a slot spaced apart from the aperture; a pulley wheel disposed exterior to the frame; and a hub extending from the pulley wheel through the aperture; wherein the hub engages the frame in a locked position, and is disengaged from the frame in an unlocked position; wherein the hub is further from the slot in the locked position than in the unlocked position; and wherein the hub and the pulley wheel are rotatable relative to the frame about a center axis of the hub when in the locked position.

Clause 2: The pulley of Clause 1, wherein the aperture has a narrowed neck, and the hub engages the frame at the narrowed neck when the hub is in the locked position.

Clause 3: The pulley of Clause 2, wherein: the aperture has a relatively wide portion adjacent to the narrowed neck; the relatively wide portion is wider than the narrowed neck; and the relatively wide portion is between the slot and the narrowed neck.

Clause 4: The pulley of Clause 1, wherein the frame comprises an anchor bar, with the slot between the anchor bar and the aperture.

Clause 5: The pulley of Clause 1, wherein the pulley wheel extends further over the slot when the hub is in the locked position than when the hub is in the unlocked position.

Clause 6: The pulley of Clause 1, wherein the hub has a textured exterior surface.

Clause 7: The pulley of Clause 6, wherein the textured exterior surface includes a plurality of grooves extending lengthwise parallel to the center axis of the hub.

Clause 8: The pulley of Clause 1, wherein: the pulley wheel has an exterior surface with a marking on the exterior surface; and the marking is positioned and shaped as an indicator of a rotational position of the pulley wheel.

Clause 9: The pulley of Clause 1, wherein: the frame includes a first plate and a second plate spaced apart from the first plate, with the first plate nearer to the pulley wheel than the second plate; the aperture extends through the second plate; the hub engages the frame at the second plate in the locked position; the first plate has an additional aperture; and the hub also extends through the additional aperture.

Clause 10: The pulley of Clause 9, wherein: the hub includes a radially-extending flange; and the pulley wheel is adjacent to an exterior surface of the first plate and the radially-extending flange is adjacent to an exterior surface of the second plate when the hub is in the locked position.

Clause 11: The pulley of Clause 9, wherein the first plate and the second plate are disc-shaped, each having a diameter not more than 10 percent less than and not more than 10 percent greater than a diameter of the pulley wheel.

Clause 12: The pulley of Clause 9, wherein: the frame has a side wall extending between and connecting the first plate and the second plate; the frame defines a continuous channel between the first plate and the second plate, inward of the side wall, and extending around the hub; and the frame defines a side slot between the first plate and the second plate extending to the continuous channel.

Clause 13: A pulley comprising: a frame defining an internal void and further defining a slot extending through the frame and spaced apart from the internal void; a pulley wheel disposed exterior to the frame and spaced apart from the slot; a plurality of legs extending from the pulley wheel and locked to the frame so that the pulley wheel is non-rotatable relative to the frame; and wherein the frame comprises an anchor bar, with the slot between the anchor bar and the internal void.

Clause 14: The pulley of Clause 13, wherein a center axis of the pulley wheel is sufficiently spaced from the slot such that the pulley wheel does not block the slot.

Clause 15: The pulley of Clause 13, wherein: the frame has a plate with spaced through holes extending to the internal void; and the plurality of legs extends into the spaced through holes and engage with the plate to lock the pulley wheel to the frame.

Clause 16: The pulley of Clause 15, wherein: the frame has a side wall extending around the internal void; and the frame defines a side slot extending through the side wall.

Clause 17: The pulley of Clause 16, wherein the side slot extends lengthwise in an arc about a center axis of the pulley wheel.

Clause 18: A wearable article comprising: a base; a pulley comprising: a frame defining an aperture and further defining a slot spaced apart from the aperture, a pulley wheel disposed exterior to the frame, and a hub extending from the pulley wheel through the aperture; wherein the hub engages the frame in a locked position, and is disengaged from the frame in an unlocked position; wherein the hub is further from the slot in the locked position than in the unlocked position; wherein the hub and the pulley wheel are rotatable relative to the frame about a center axis of the hub when in the locked position; an anchoring strap secured to the base and extending through the slot to anchor the pulley to the base; and a tensioning cable extending around the hub and engaging the hub to rotate the pulley wheel when tensioned.

Clause 19: The wearable article of Clause 18, wherein: the frame has a first plate, a second plate, and a side wall extending between and connecting the first plate and the second plate; and the frame defines a continuous channel between the first plate and the second plate, inward of the side wall, and extending around the hub; the frame defines a side slot between the first plate and the second plate extending to the continuous channel; and the tensioning cable extends through the side slot and around the hub in the continuous channel.

Clause 20: The wearable article of Clause 19, wherein: the hub has a textured surface; and the tensioning cable engages the textured surface to turn the hub when the tensioning cable is tensioned.

To assist and clarify the description of various embodiments, various terms are defined herein. Unless otherwise indicated, the following definitions apply throughout this specification (including the claims). Additionally, all references referred to are incorporated herein in their entirety.

"A", "an", "the", "at least one", and "one or more" are used interchangeably to indicate that at least one of the items is present. A plurality of such items may be present unless the context clearly indicates otherwise. All numerical values of parameters (e.g., of quantities or conditions) in this specification, unless otherwise indicated expressly or clearly in view of the context, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. As used in the description and the accompanying claims, a value is considered to be "approximately" equal to a stated value if it is neither more than 5 percent greater than nor more than 5 percent less than the stated value. In addition, a disclosure of a range is to be understood as specifically disclosing all values and further divided ranges within the range.

The terms "comprising", "including", and "having" are inclusive and therefore specify the presence of stated features, steps, operations, elements, or components, but do not preclude the presence or addition of one or more other features, steps, operations, elements, or components. Orders of steps, processes, and operations may be altered when possible, and additional or alternative steps may be employed. As used in this specification, the term "or" includes any one and all combinations of the associated listed items. The term "any of" is understood to include any possible combination of referenced items, including "any one of" the referenced items. The term "any of" is understood to include any possible combination of referenced claims of the appended claims, including "any one of" the referenced claims.

For consistency and convenience, directional adjectives may be employed throughout this detailed description corresponding to the illustrated embodiments. Those having ordinary skill in the art will recognize that terms such as "above", "below", "upward", "downward", "top", "bottom", etc., may be used descriptively relative to the figures, without representing limitations on the scope of the invention, as defined by the claims.

The term "longitudinal" refers to a direction extending a length of a component. For example, a longitudinal direction of a shoe extends between a forefoot region and a heel region of the shoe. The term "forward" or "anterior" is used to refer to the general direction from a heel region toward a forefoot region, and the term "rearward" or "posterior" is used to refer to the opposite direction, i.e., the direction from the forefoot region toward the heel region. In some cases, a component may be identified with a longitudinal axis as well as a forward and rearward longitudinal direction along that axis. The longitudinal direction or axis may also be referred to as an anterior-posterior direction or axis.

The term "transverse" refers to a direction extending a width of a component. For example, a transverse direction of a shoe extends between a lateral side and a medial side of the shoe. The transverse direction or axis may also be referred to as a lateral direction or axis or a mediolateral direction or axis.

The term "vertical" refers to a direction generally perpendicular to both the lateral and longitudinal directions. For example, in cases where a sole is planted flat on a ground surface, the vertical direction may extend from the ground surface upward. It will be understood that each of these directional adjectives may be applied to individual components of a sole. The term "upward" or "upwards" refers to the vertical direction pointing towards a top of the component, which may include an instep, a fastening region and/or a throat of an upper. The term "downward" or "downwards" refers to the vertical direction pointing opposite the upwards direction, toward the bottom of a component and may generally point towards the bottom of a sole structure of an article of footwear.

As used herein, a "wearable article" is an article that may be worn on a human body. Non-limiting examples of wearable articles include footwear, apparel, carry bags such as backpacks, purses, duffel bags, fanny packs, and other types of portable containment structures intended to be worn on a human body. As used herein, for the purposes of this application and its claims, a "carry bag" is a containment device that may have one or more straps or handles configured for placement on a human body, and includes but is not limited to backpacks, purses, duffle bags, and fanny packs.

The terms "interior", "inner side" and "proximal" with respect to an article refer to relative portions of an article closer to the center of the article than "exterior", "outer side", and "distal" portions of the article when the article is assembled. Thus, the terms interior and exterior may be understood to provide generally opposing terms to describe relative spatial positions, as may inner side and outer side, and proximal and distal.

While various embodiments have been described, the description is intended to be exemplary, rather than limiting and it will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims.

While several modes for carrying out the many aspects of the present teachings have been described in detail, those familiar with the art to which these teachings relate will recognize various alternative aspects for practicing the present teachings that are within the scope of the appended claims. It is intended that all matter contained in the above description or shown in the accompanying drawings shall be interpreted as illustrative and exemplary of the entire range of alternative embodiments that an ordinarily skilled artisan would recognize as implied by, structurally and/or functionally equivalent to, or otherwise rendered obvious based upon the included content, and not as limited solely to those explicitly depicted and/or described embodiments.

What is claimed is:

1. A pulley comprising:
- a frame defining an aperture and further defining a slot spaced apart from the aperture;
- a pulley wheel disposed exterior to the frame; and
- a hub extending from the pulley wheel through the aperture;
- wherein the hub engages the frame in a locked position, and is disengaged from the frame in an unlocked position; wherein the hub is further from the slot in the locked position than in the unlocked position; and wherein the hub and the pulley wheel are rotatable relative to the frame about a center axis of the hub when in the locked position.

2. The pulley of claim 1, wherein the aperture has a narrowed neck, and the hub engages the frame at the narrowed neck when the hub is in the locked position.

3. The pulley of claim 2, wherein:
- the aperture has a relatively wide portion adjacent to the narrowed neck;
- the relatively wide portion is wider than the narrowed neck; and
- the relatively wide portion is between the slot and the narrowed neck.

4. The pulley of claim 1, wherein the frame comprises an anchor bar, with the slot between the anchor bar and the aperture.

5. The pulley of claim 1, wherein the pulley wheel extends further over the slot when the hub is in the locked position than when the hub is in the unlocked position.

6. The pulley of claim 1, wherein the hub has a textured exterior surface.

7. The pulley of claim 6, wherein the textured exterior surface includes a plurality of grooves extending lengthwise parallel to the center axis of the hub.

8. The pulley of claim 1, wherein:
- the pulley wheel has an exterior surface with a marking on the exterior surface; and
- the marking is positioned and shaped as an indicator of a rotational position of the pulley wheel.

9. The pulley of claim 1, wherein:
- the frame includes a first plate and a second plate spaced apart from the first plate, with the first plate nearer to the pulley wheel than the second plate;
- the aperture extends through the second plate;
- the hub engages the frame at the second plate in the locked position;
- the first plate has an additional aperture; and
- the hub also extends through the additional aperture.

10. The pulley of claim 9, wherein:
- the hub includes a radially-extending flange; and
- the pulley wheel is adjacent to an exterior surface of the first plate and the radially-extending flange is adjacent to an exterior surface of the second plate when the hub is in the locked position.

11. The pulley of claim 9, wherein the first plate and the second plate are disc-shaped, each having a diameter not more than 10 percent less than and not more than 10 percent greater than a diameter of the pulley wheel.

12. The pulley of claim 9, wherein:

the frame has a side wall extending between and connecting the first plate and the second plate;

the frame defines a continuous channel between the first plate and the second plate, inward of the side wall, and extending around the hub; and the frame defines a side slot between the first plate and the second plate extending to the continuous channel.

13. A pulley comprising:

a frame defining an internal void and further defining a slot extending through the frame and spaced apart from the internal void;

a pulley wheel disposed exterior to the frame and spaced apart from the slot;

a plurality of legs extending from the pulley wheel and locked to the frame so that the pulley wheel is non-rotatable relative to the frame;

wherein the frame has a side wall extending around the internal void;

wherein the slot is spaced apart from and separated from the internal void by the side wall; and wherein the frame comprises an anchor bar, with the slot between the anchor bar and the side wall.

14. The pulley of claim 13, wherein a center axis of the pulley wheel is sufficiently spaced from the slot such that the pulley wheel does not block the slot.

15. The pulley of claim 13, wherein:

the frame has a plate with spaced through holes extending to the internal void; and the plurality of legs extends into the spaced through holes and engage with the plate to lock the pulley wheel to the frame.

16. The pulley of claim 15, wherein:

the frame defines a side slot extending through the side wall.

17. The pulley of claim 16, wherein the side slot extends lengthwise in an arc about a center axis of the pulley wheel.

18. A wearable article comprising:

a base;

a pulley comprising:

a frame defining an aperture and further defining a slot spaced apart from the aperture, a pulley wheel disposed exterior to the frame, and a hub extending from the pulley wheel through the aperture;

wherein the hub engages the frame in a locked position, and is disengaged from the frame in an unlocked position; wherein the hub is further from the slot in the locked position than in the unlocked position; wherein the hub and the pulley wheel are rotatable relative to the frame about a center axis of the hub when in the locked position;

an anchoring strap secured to the base and extending through the slot to anchor the pulley to the base; and a tensioning cable extending around the hub and engaging the hub to rotate the pulley wheel when tensioned.

19. The wearable article of claim 18, wherein:

the frame has a first plate, a second plate, and a side wall extending between and connecting the first plate and the second plate;

the frame defines a continuous channel between the first plate and the second plate, inward of the side wall, and extending around the hub;

the frame defines a side slot between the first plate and the second plate extending to the continuous channel; and the tensioning cable extends through the side slot and around the hub in the continuous channel.

20. The wearable article of claim 19, wherein:

the hub has a textured surface; and the tensioning cable engages the textured surface to turn the hub when the tensioning cable is tensioned.

* * * * *